(12) United States Patent
Hanano

(10) Patent No.: US 9,482,870 B2
(45) Date of Patent: Nov. 1, 2016

(54) LIGHT SOURCE APPARATUS

(71) Applicant: OLYMPUS CORPORATION, Tokyo (JP)

(72) Inventor: Kazunari Hanano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 15 days.

(21) Appl. No.: 14/571,397

(22) Filed: Dec. 16, 2014

(65) Prior Publication Data

US 2015/0098242 A1 Apr. 9, 2015

Related U.S. Application Data

(63) Continuation of application No. PCT/JP2013/066880, filed on Jun. 19, 2013.

(30) Foreign Application Priority Data

Jun. 25, 2012 (JP) .................................. 2012-141927

(51) Int. Cl.
*F21S 4/00* (2016.01)
*G02B 27/09* (2006.01)
(Continued)

(52) U.S. Cl.
CPC ................. *G02B 27/09* (2013.01); *F21V 9/00* (2013.01); *G02B 6/32* (2013.01); *G02B 6/4214* (2013.01); *G02B 27/141* (2013.01); *G02B 27/30* (2013.01);
(Continued)

(58) Field of Classification Search
CPC .... G02B 27/09; G02B 27/30; G02B 27/141; G02B 6/32; G02B 6/4214; G02B 6/4206; F21V 9/00; G21Y 2101/025
See application file for complete search history.

(56) References Cited

U.S. PATENT DOCUMENTS 4,924,870 A 5/1990 Wlodarczyk et al.
5,341,245 A 8/1994 Tamagawa et al.
(Continued)

FOREIGN PATENT DOCUMENTS

JP 2002-051969 A 2/2002
JP 2002-065602 A 3/2002
(Continued)

OTHER PUBLICATIONS

International Search Report dated Jul. 30, 2013 issued in PCT/JP2013/066880.
(Continued)

*Primary Examiner* — Y M Lee
(74) *Attorney, Agent, or Firm* — Scully, Scott, Murphy & Presser, PC

(57) ABSTRACT

Provided is a light source apparatus including a plurality of semiconductor light sources that output beams of light having different wavelengths; a plurality of light collimating portions that convert the respective beams of light output from these light sources to collimated light beams; a combining portion that combines the plurality of collimated beams produced by these light collimating portions into a single light path; a light guide whose entrance end is disposed in the single light path; a focusing portion that focuses the collimated beams combined by the combining portion onto the entrance end; and a light-distribution-characteristics adjusting portion that adjusts beam diameters of the plurality of beams of light so that numerical apertures of the plurality of beams of light incident on the entrance end become substantially equal.

9 Claims, 7 Drawing Sheets

(51) Int. Cl.
  *F21V 9/00* (2015.01)
  *G02B 6/32* (2006.01)
  *G02B 27/14* (2006.01)
  *G02B 27/30* (2006.01)
  *F21Y 101/02* (2006.01)
  *G02B 6/42* (2006.01)

(52) U.S. Cl.
  CPC ....... *F21Y 2101/02* (2013.01); *F21Y 2101/025* (2013.01); *G02B 6/4206* (2013.01)

(56) References Cited

U.S. PATENT DOCUMENTS

| | | | |
|---|---|---|---|
| 2002/0021355 A1 | 2/2002 | Utsui et al. | |
| 2002/0026099 A1 | 2/2002 | Adachi et al. | |
| 2004/0051922 A1 | 3/2004 | Kimura et al. | |
| 2007/0139933 A1* | 6/2007 | Cheng | G02B 6/0006 362/341 |
| 2011/0134519 A1* | 6/2011 | Cooper | G02B 21/0032 359/385 |
| 2012/0215066 A1 | 8/2012 | Akiyama et al. | |
| 2013/0335797 A1* | 12/2013 | Cooper | G02B 21/16 359/199.2 |

FOREIGN PATENT DOCUMENTS

| | | |
|---|---|---|
| JP | 2005-342033 A | 12/2005 |
| JP | 2005-342034 A | 12/2005 |
| JP | 2005-342431 A | 12/2005 |
| JP | 2006-026128 A | 2/2006 |
| WO | WO 2011/162111 A1 | 12/2011 |
| WO | WO 2012118424 A1 * | 9/2012 ........... G02B 27/141 |

OTHER PUBLICATIONS

Extended Supplementary European Search Report dated Jan. 25, 2016 from related European Application No. 13 80 9967.6.

* cited by examiner

LIGHT SOURCE APPARATUS

CROSS-REFERENCE TO RELATED APPLICATIONS

This is a continuation of International Application PCT/JP2013/066880, with an international filing date of Jun. 19, 2013, which is hereby incorporated by reference herein in its entirety. This application claims the benefit of Japanese Patent Application No. 2012-141927, filed on Jun. 25, 2012, the content of which is incorporated herein by reference.

TECHNICAL FIELD

The present invention relates to a light source apparatus.

BACKGROUND ART

In the related art, there is a known light source apparatus in which a plurality of light sources that output light with different wavelength bands are combined (for example, see Patent Literature 1). In Patent Literature 1, a white-light source having a light-emission spectrum in the entire visible light region and an excitation-light source that outputs light in a comparatively narrow wavelength band are used. The spatial intensity distributions of the white light and the excitation light separately output from the two light sources differ from each other. Therefore, to irradiate the same position on a specimen with the white light and the excitation light to perform accurate analysis, it is necessary to make the spatial intensity distributions of these two types of light the same at the irradiation position. In Patent Literature 1, by shifting the focal position of a lens that focuses the white light and the excitation light at an entrance end of a light guide in the optical-axis direction from the entrance end, the difference between the intensity distributions of the white light and the excitation light at the entrance end can be minimized.

In recent years, semiconductor light sources such as LEDs have come to be used instead of lamp-type light sources such as the white-light source and excitation-light source described above. Semiconductor light sources have features such as long lifetime, high efficiency, high response, and so forth. The wavelength band of the light output from semiconductor light sources is narrow. Therefore, if light with a wide wavelength band is needed, a plurality of semiconductor light sources are used in combination, and beams of light with a plurality of wavelengths are combined.

The angular characteristics of the light output from a semiconductor light source differ depending on the material and structure of the chip, or the structure of the package etc. The angular characteristics of the light are maintained even while the light is guided through a light guide. Therefore, just by adjusting the intensity distributions of the light at the entrance end of the light guide, as in Patent Literature 1, due to differences in the angular characteristics of each type of light after being emitted from the light guide, a difference between the light intensity distributions occurs, and as a result, color unevenness occurs at the irradiation position on the specimen.

CITATION LIST

Patent Literature

{PTL 1}
Japanese Unexamined Patent Application, Publication No. 2005-342431

SUMMARY OF INVENTION

The present invention provides a light source apparatus including a plurality of semiconductor light sources that output beams of light having mutually different wavelengths; a plurality of light collimating portions that convert the respective beams of light output from the plurality of semiconductor light sources to collimated beams; a combining portion that combines the plurality of collimated beams produced by the plurality of light collimating portions into a single light path; a light guide whose entrance end is disposed in the single light path and that guides the light incident on the entrance end to an exit end; a focusing portion that focuses the collimated beams combined by the combining portion onto the entrance end of the light guide; and a light-distribution-characteristics adjusting portion that adjusts beam diameters of the plurality of beams of light so that numerical apertures of the plurality of beams of light incident on the entrance end of the light guide are made substantially equal.

DESCRIPTION OF EMBODIMENT

A light source apparatus 1 according to an embodiment of the present invention will be described below with reference to the drawings.

Figure 1:
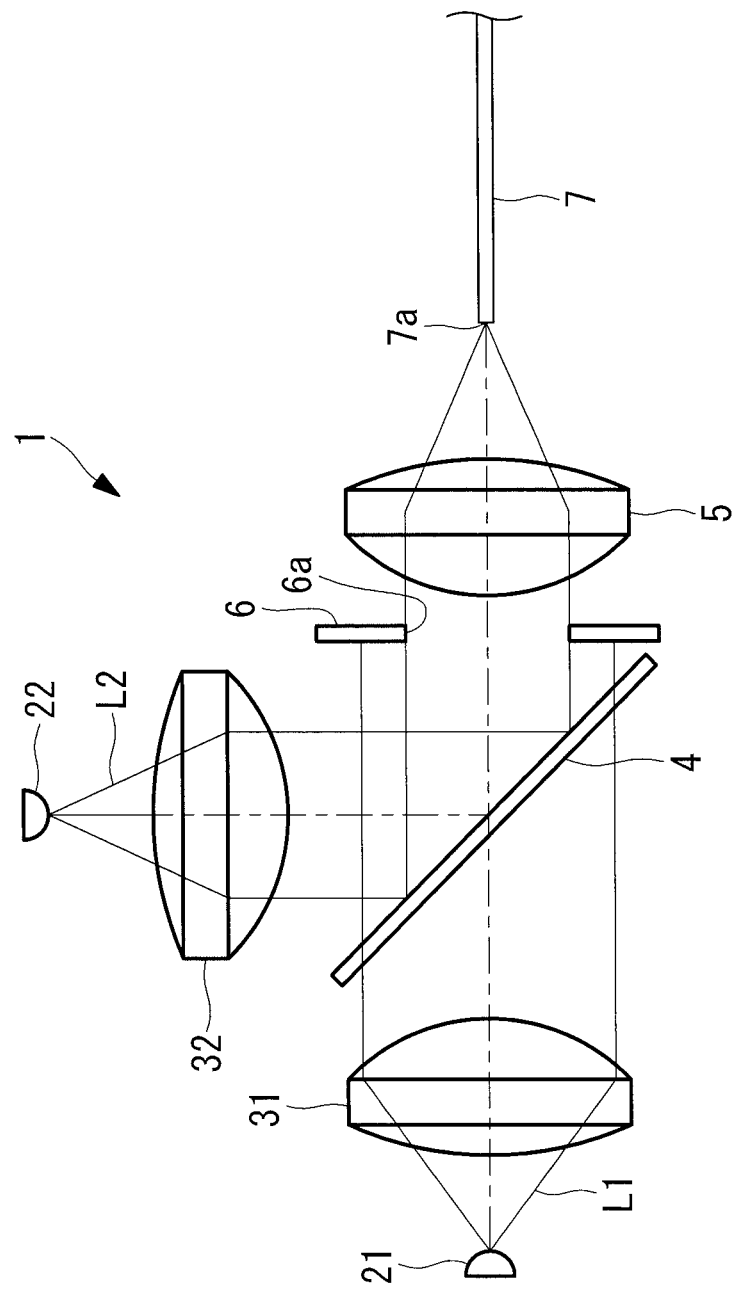
FIG. 1 is a diagram of the overall configuration of a light source apparatus according to an embodiment of the present invention.

As shown in FIG. 1, the light source apparatus 1 according to this embodiment includes two LEDs (light emitting diodes, semiconductor light sources) 21 and 22 that output light L1 and L2 having different wavelengths from each other; two collimator lenses (light collimating portions) 31 and 32 that convert the light L1 and L2 from the respective LEDs 21 and 22 to collimated beams; a dichroic mirror (combining portion) 4 that combines the light L1 and L2 that have passed through the collimator lenses 31 and 32 into a single light path; a condenser lens (focusing portion) 5 that converges the light combined by the dichroic mirror 4; an aperture diaphragm (light-distribution-characteristics adjusting portion) 6 that is disposed between the dichroic mirror 4 and the condenser lens 5; and a light guide 7 on which the light converged by the condenser lens 5 is incident.

Figure 2:
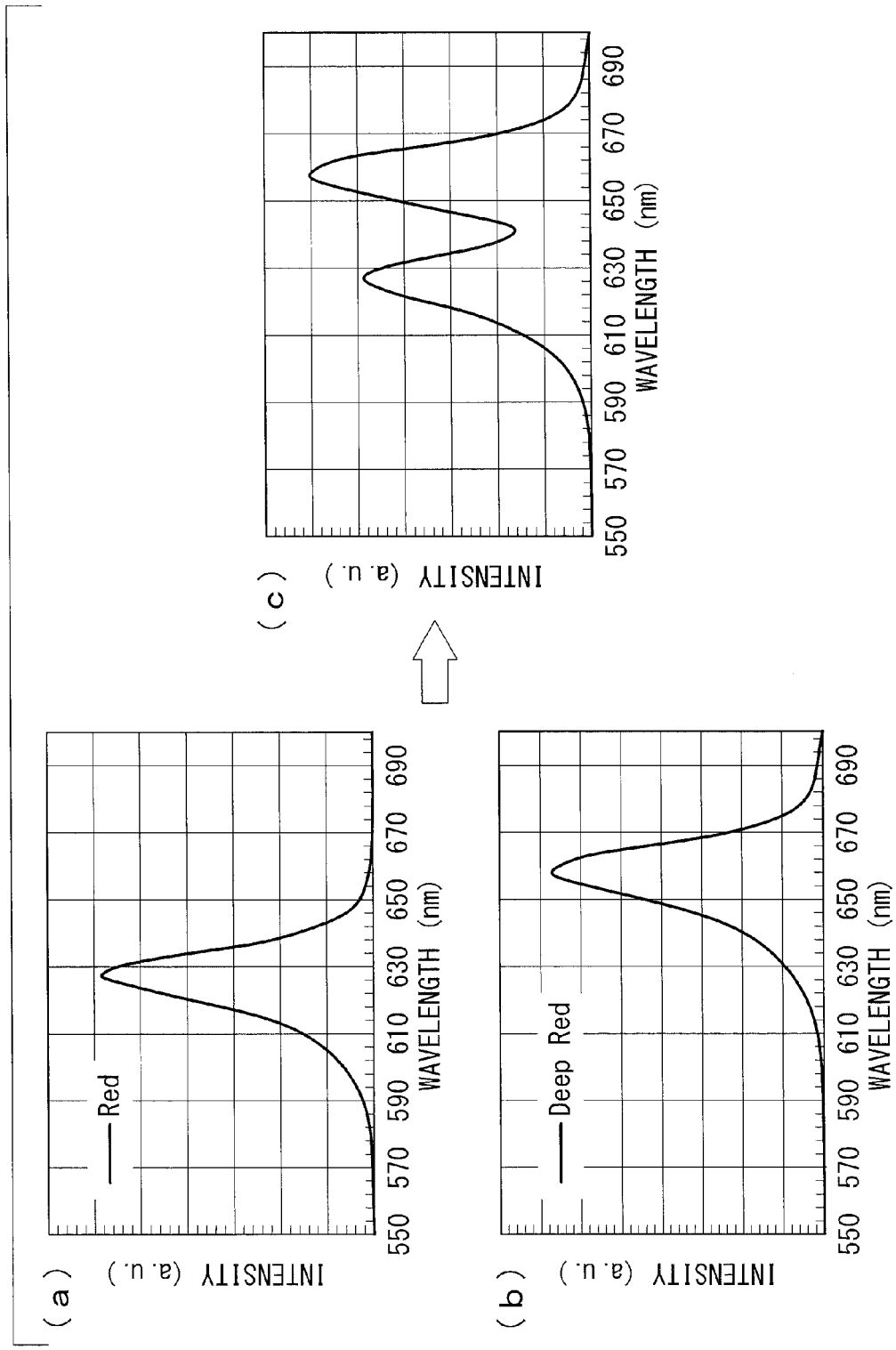
FIG. 2 contains graphs showing (a) the light emission spectrum of a first LED and (b) the light-emission spectrum of a second LED provided in the light source apparatus in FIG. 1, and (c) the spectrum of output light emitted from an exit end of a light guide.
Figure 3:
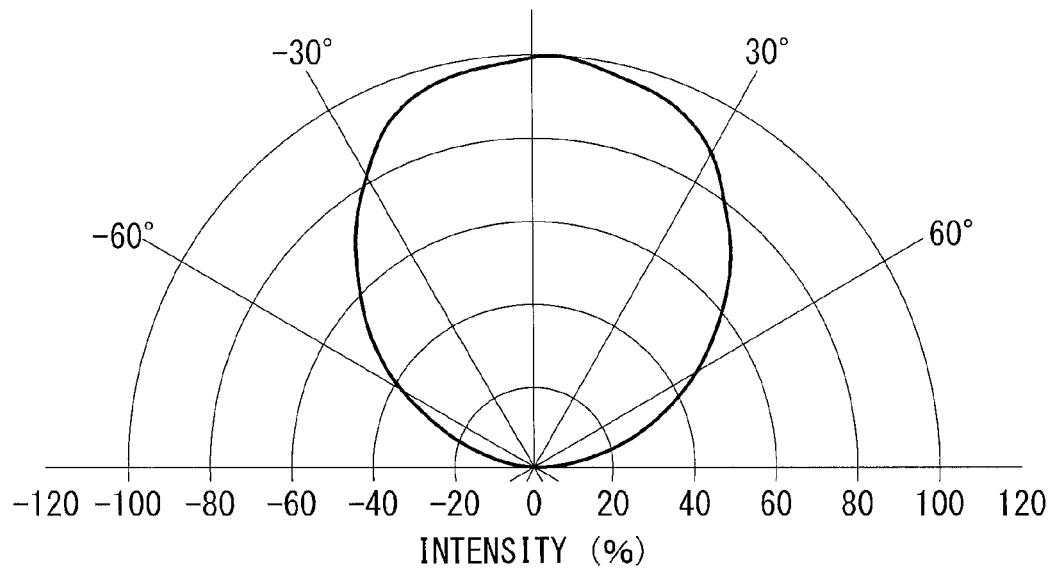
FIG. 3 is a graph showing the angular characteristics of first light output from the first LED.
Figure 4:
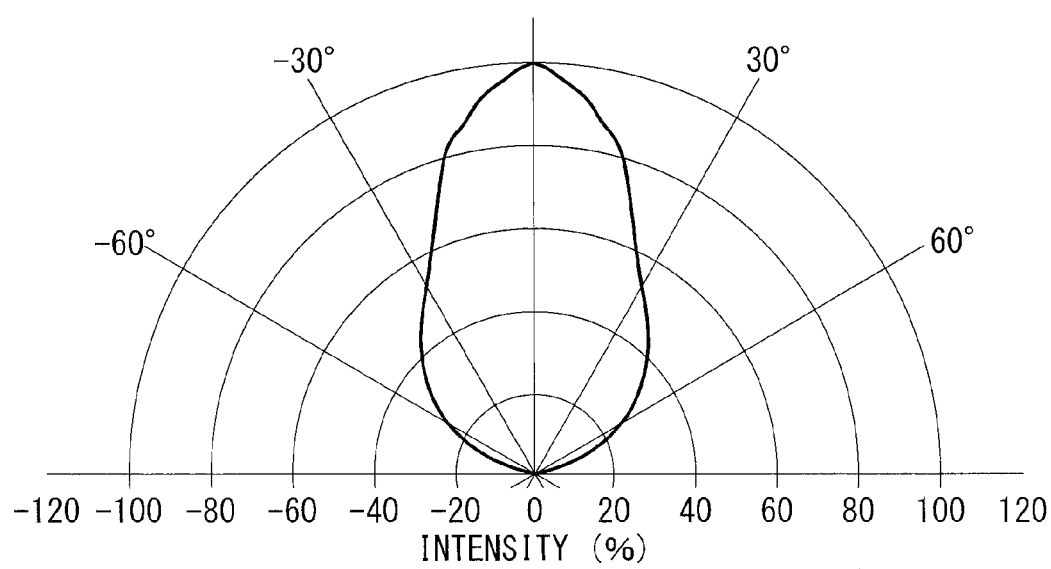
FIG. 4 is a graph showing the angular characteristics of second light output from the second LED.

FIG. 2(*a*) shows the light-emission spectrum of the first light L1 output from the first LED 21. FIG. 2(*b*) shows the light-emission spectrum of the second light L2 output from the second LED 22. FIG. 3 and FIG. 4 respectively show the angular characteristics of the first light L1 and the second light L2. As shown in FIG. 3 and FIG. 4, the first light L1 has angular characteristics wider than those of the second light L2. In other words, the second light L2 advances while maintaining a substantially constant beam diameter, whereas the first light L1 has angular characteristics such that the beam diameter gradually expands as the light advances.

The collimator lenses 31 and 32 are disposed so that front focal positions thereof are coincident with the positions of chips (not illustrated) that serve as light emission points of the respective LEDs 21 and 22. For example, lenses having focal lengths of 14 mm and diameters of 19 mm are used as the collimator lenses 31 and 32.

The dichroic mirror 4 transmits the first light L1 that has been converted to a collimated beam by one collimator lens 31, and also reflects the second light L2 that has been converted to a collimated beam by the other collimator lens 32, thereby combining the two beams of light L1 and L2 onto the same light path.

A lens having the same specifications as those of the collimator lenses 31 and 32, or a lens having different specifications, may be used as the condenser lens 5.

The aperture diaphragm 6 adjusts the beam diameter of the light L1 and L2 so that the numerical apertures of the two beams of light L1 and L2 incident on the entrance end 7*a* of the light guide 7 are made substantially equal. By using the aperture diaphragm 6 as the light-distribution-characteristics adjusting portion and disposing the aperture diaphragm 6 between the dichroic mirror 4 and the condenser lens 5, the numerical apertures of the two beams of light L1 and L2 incident on the entrance end 7*a* can be made equal with good precision, and with a simple configuration using the single aperture diaphragm 6. The numerical apertures of the light L1 and L2 should be sufficiently equalized so as to satisfy the color uniformity precision specified for the output light in accordance with the intended purpose, such as observation, measurement, and so forth; that is to say, they should be sufficiently equalized so that the color unevenness falls within an allowable range. In this embodiment, the aperture diaphragm 6 is disposed so that the center of an opening 6*a* thereof is aligned with the optical axis of the light L1 and L2 combined by the dichroic mirror 4. The diameter (opening diameter) of the opening 6*a* is less than or equal to the beam diameter of the light having the narrower angular characteristics between the first light L1 and the second light L2, and is preferably the same as this beam diameter. In this embodiment, the diameter of the opening 6*a* is the same as the beam diameter of the collimated second light L2 and, for example, is 10 mm.

The proximal end of the light guide 7, that is, the entrance end 7*a*, is disposed at the focal position of the condenser lens 5. For example, a multimode fiber having a diameter of 2 mm and a numerical aperture of 0.5 is used as the light guide 7, so that the light incident on the entrance end 7*a* at an angle of incidence smaller than 30° is guided by the light guide 7.

Next, the operation of the thus-configured light source apparatus will be described.

The light source apparatus 1 according to this embodiment produces output light with a wide wavelength band by combining two LEDs 21 and 22 having light emission spectra with narrow wavelength bands that are different from each other. The first light L1 and the second light L2 with different wavelengths, output from the respective LEDs 21 and 22, are respectively converted to collimated beams by the collimator lenses 31 and 32, and are then combined into a single beam of light by the dichroic mirror 4. The combined beams of light L1 and L2 are converged by the condenser lens 5 and are incident on the light guide 7. Accordingly, output light whose wavelength band is expanded by combining the first light L1 and the second light L2, as shown in FIG. 2(*c*), is emitted from the exit end (not illustrated) of the light guide 7.

The first light L1 and the second light L2, which have been converted to collimated beams, are combined into a single light beam by the dichroic mirror 4, and then they are incident on the condenser lens 5 after the beam diameters thereof have been adjusted to be identical to each other by the aperture diaphragm 6. In other words, of the light L1 and L2 incident on the aperture diaphragm 6, the entire beam of the second light L2 passes through the opening 6*a* of the aperture diaphragm 6. As for the first light L1, on the other hand, the peripheral part that extends out farther than the beam of the second light L2 is blocked by the aperture diaphragm 6, and only the central part that overlaps with the beam of the second light L2 passes through the opening 6*a*. By doing so, for the angle of incidence at which the two beams of light L1 and L2 are incident on the entrance end 7*a* of the light guide 7, at least in an area close to the angle corresponding to the numerical aperture, the two beams of light L1 and L2 are output from the aperture diaphragm 6 in a state where the angular characteristics are equal. Thus, the first light L1 and the second light L2 are incident on the entrance end 7*a* of the light guide 7 with the same numerical apertures, due to the condenser lens 5.

Thus, with this embodiment, the two beams of light L1 and L2 having different angular characteristics are made to have the same direction at the entrance end 7*a* of the light guide 7 by means of the collimator lenses 31 and 32 and the dichroic mirror 4, and the numerical apertures when they are incident on the entrance end 7*a* are made equal to each other by means of the aperture diaphragm 6. By doing so, the output light that is emitted from the light guide 7 is light formed by combining the two beams of light L1 and L2 in a state in which the angular characteristics thereof are the same at least in the peripheral part of the beam, and therefore, an advantage is afforded in that it is possible to reduce color unevenness of the output light.

Furthermore, from the viewpoint of the light distribution characteristics of the LEDs 21 and 22, when the angular characteristics of the two beams of light L1 and L2 are substantially the same in an area where the angle of incidence on the entrance end 7*a* of the light guide 7 is small, it is possible to make the two beams of light L1 and L2 overlap with each other in a state in which the angular characteristics are the same over the entire beams. In this case, the output light that is emitted from the light guide 7 can be made to form light having no color unevenness, by uniformly combining the two beams of light L1 and L2 over the entire beams.

Figure 5:
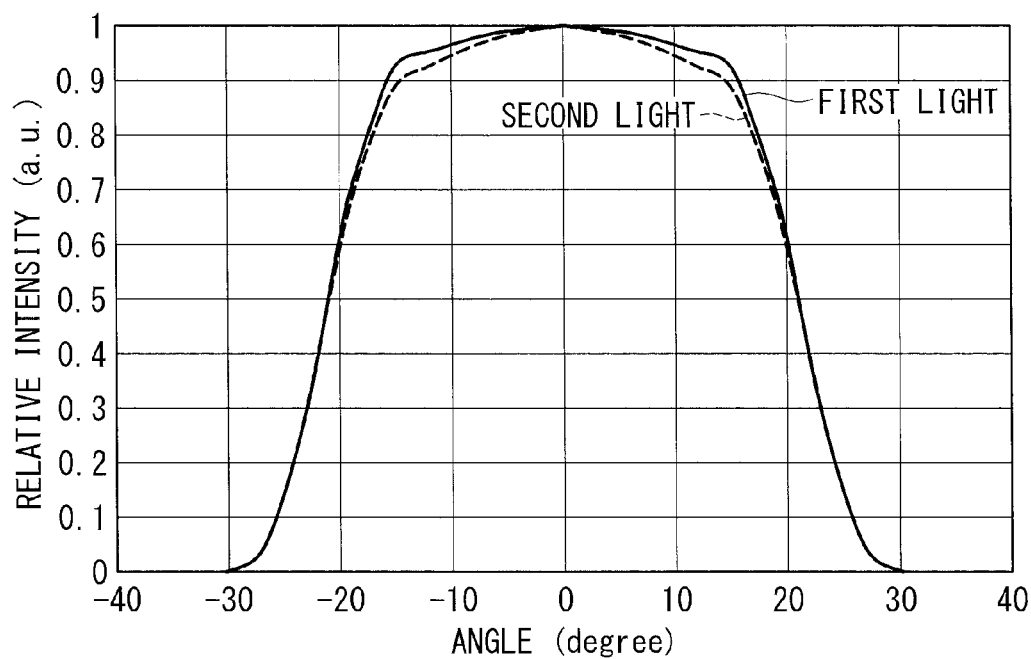
FIG. 5 is a graph showing the angular characteristics of the output light produced by the light source apparatus in FIG. 1.

FIG. 5 is a graph showing the angular characteristics of the light L1 and L2 incident on the light guide 7 in the light source apparatus 1 according to this embodiment. As shown in FIG. 5, the angular characteristics of the first light L1 and the second light L2 are substantially identical. Since these angular characteristics are maintained while the light is guided through the light guide 7, the light output from the light guide 7 also has angular characteristics similar to those in FIG. 5. Therefore, the output light that is emitted from the light guide 7 is light that is formed by combining the two beams of light L1 and L2 with substantially the same ratio at any angle and whose color unevenness is reduced over the entire beam.

Figure 6:
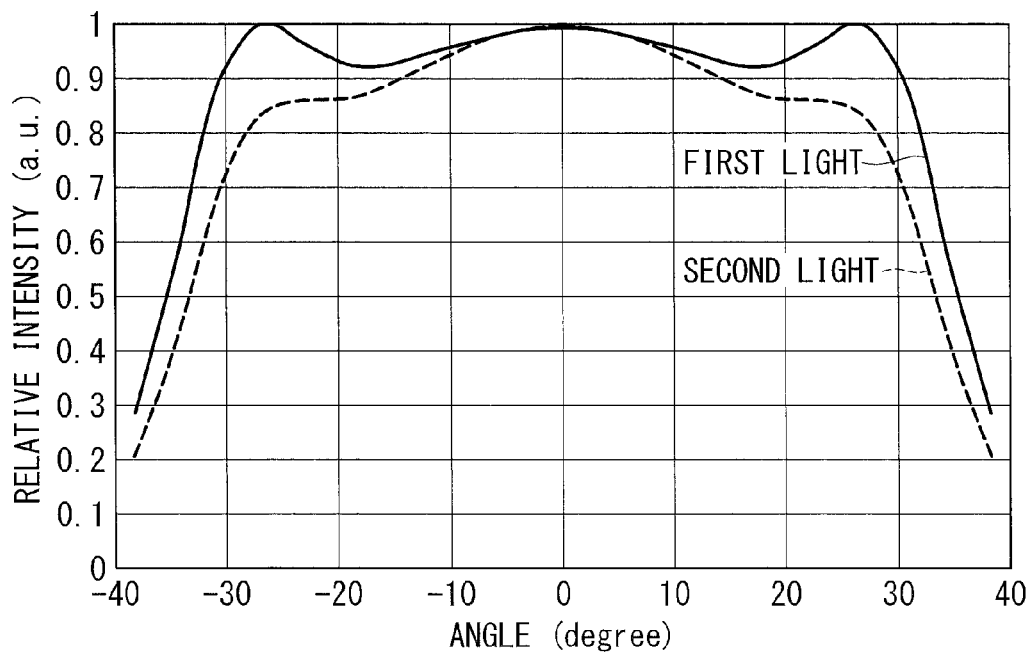
FIG. 6 is a graph showing the angular characteristics of output light produced by a light source apparatus that is not provided with an aperture diaphragm.

FIG. 6 is a graph showing, as a comparative example, the angular characteristics of each of the light L1 and L2 incident on the light guide 7 in the case where the aperture diaphragm 6 in the configuration in FIG. 1 is omitted. As shown in FIG. 6, in the light source apparatus that is not provided with the aperture diaphragm 6, in the area where the angle of incidence on the entrance end 7a is large, the light intensity of the first light L1 is relatively large compared with that of the second light L2, causing a color difference between the center portion and the peripheral portion of the beams. In FIG. 5 and FIG. 6, the vertical axis indicates the intensity, where the intensities of the light L1 and L2 at an angle of 0°, corresponding to the center position of the beam, are each normalized to 1.

In addition, regarding methods of reducing variations in the angular characteristics of the two beams of light L1 and L2, there is also a method in which the focal lengths of the two collimator lenses 31 and 32 are adjusted; this method, however, requires severe design constraints. In contrast, this embodiment has the advantage of a simple light-path configuration, while also making it possible to correct variations in the angular characteristics of the two beams of light L1 and L2. In particular, by disposing the aperture diaphragm 6 at a position where the first light L1 and the second light L2 are collimated beams, it is possible to relax the positioning precision of the aperture diaphragm 6.

Figure 7:
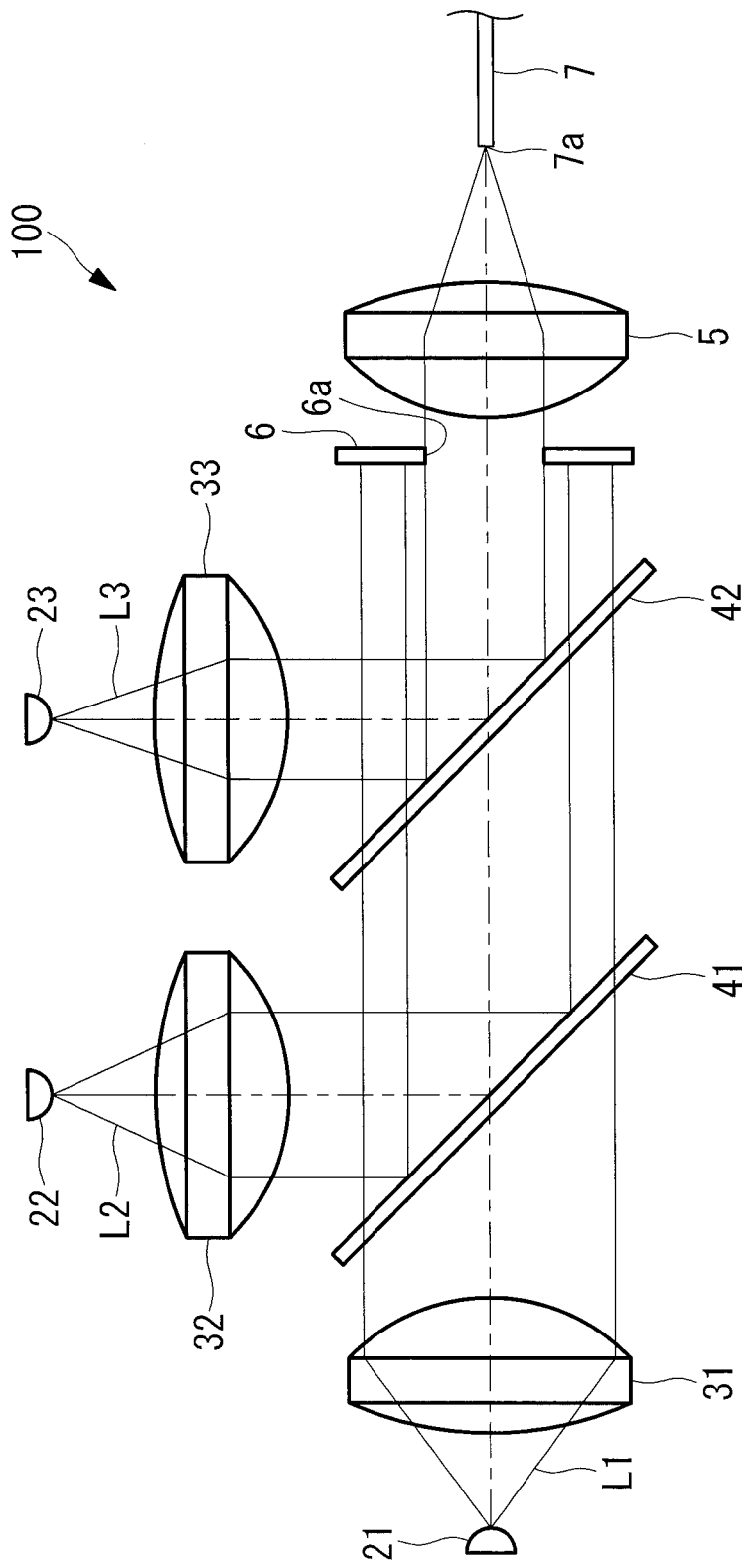
FIG. 7 is a diagram showing the overall configuration of a modification of the light source apparatus in FIG. 1.

In this embodiment, although it is assumed that two LEDs 21 and 22 are provided, the number of LEDs can be arbitrarily selected. FIG. 7 is a diagram showing the overall configuration of a light source apparatus 100 according to a modification in which three LEDs 21, 22, and 23 are provided. The light source apparatus 100 is provided with two dichroic mirrors 41 and 42 for combining three beams of light L1, L2, and L3 into a single light path. The diameter (opening diameter) of the opening 6a of the aperture diaphragm 6 is equal to or less than the beam diameter of the light having the narrowest angular characteristics among the three beams of light L1, L2, and L3, and preferably the same as that beam diameter. By doing so, it is possible to produce output light in which the three beams of light L1, L2, and L3 are combined in a state in which the angular characteristics are the same, at least in the peripheral part of the beam. In this modification, too, it is preferable to dispose the aperture diaphragm 6 between the condenser lens 5 and the dichroic mirror 42 at the rear end so that the three beams of light L1, L2, and L3 pass through the aperture diaphragm 6 after being converted to collimated beams and combined.

Figure 8:
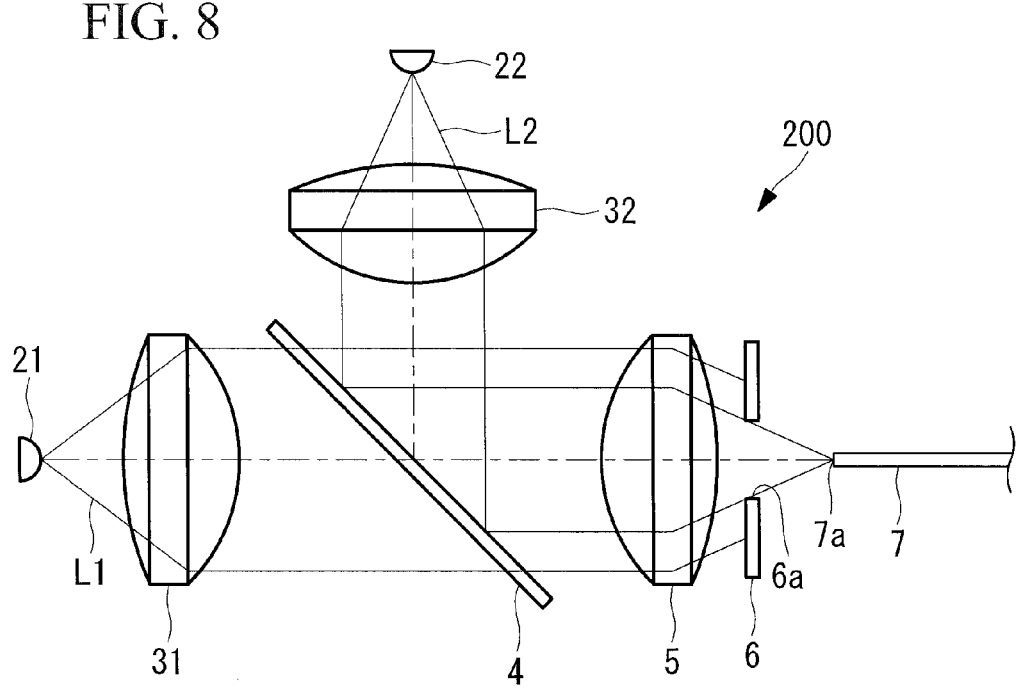
FIG. 8 is a diagram showing the overall configuration of another modification of the light source apparatus in FIG. 1.

In this embodiment, although it has been assumed that the aperture diaphragm 6 is disposed between the dichroic mirror 4 and the condenser lens 5, instead of this, as shown in FIG. 8, it may be disposed between the condenser lens 5 and the light guide 7. In a light source apparatus 200 according to this modification, the diameter of the opening 6a of the aperture diaphragm 6 is determined by the position of the aperture diaphragm 6 in the optical axis direction.

In this case, too, by removing the peripheral part of the beam in the first light L1 having wider angular characteristics with the aperture diaphragm 6, it is possible to make the numerical apertures of the two beams of light L1 and L2 equal. Also, by disposing the aperture diaphragm 6 at a position closer to the entrance end 7a of the light guide 7, it is possible to improve the uniformity of the light convergence on the light guide 7.

Figure 9:
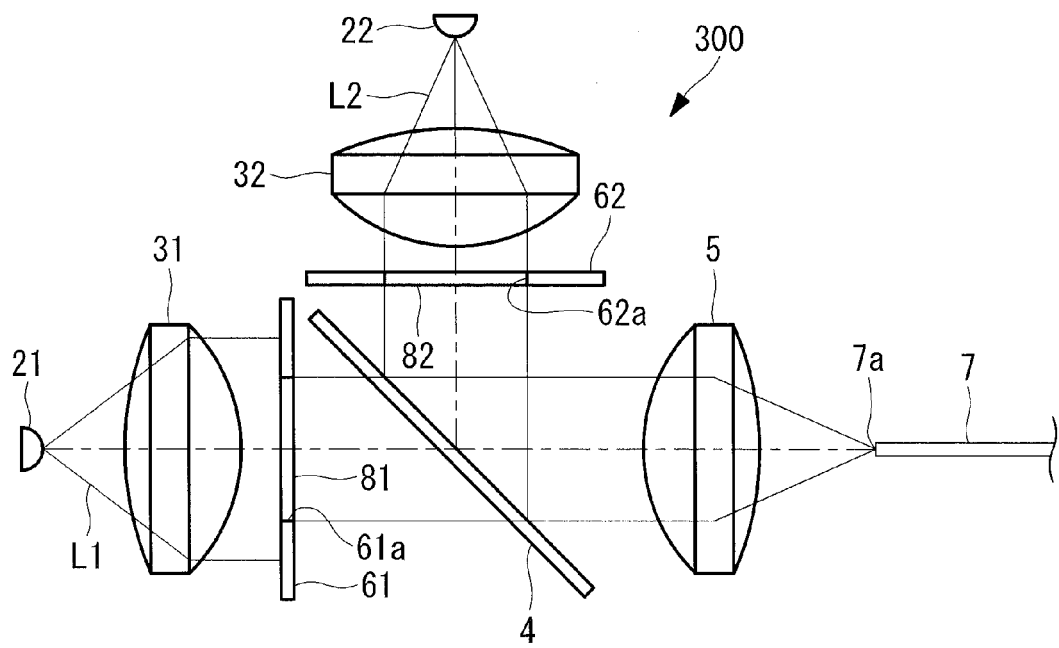
FIG. 9 is a diagram showing the overall configuration of another modification of the light source apparatus in FIG. 1.

In addition, as shown in FIG. 9, in this embodiment, two aperture diaphragms 61 and 62 may be disposed in a plurality of light paths between the respective collimator lenses 31 and 32 and the dichroic mirror 4. In this case, the opening diameters of the respective openings 61a and 62a of the aperture diaphragms 61 and 62 are substantially the same. The opening diameters of the openings 61a and 62a should be made sufficiently equal so as to satisfy the color uniformity precision determined for the output light according to the intended purpose, such as observation, measurement, and so forth.

In this case, too, it is possible to make the numerical apertures of the two beams of light L1 and L2 equal. In addition, since unwanted light that would eventually not be incident on the light guide 7 is removed at an earlier stage in the light path, it is possible to suppress the generation of stray light.

Furthermore, in this embodiment, the aperture diaphragm 6 may be disposed in one of the light paths between the collimator lenses 31 and 32 and the dichroic mirror 4. In this case, the light path in which the aperture diaphragm 6 must be disposed is the light path along which the light having the wider angular characteristics among the two beams of light L1 and L2 travels. In addition, the diameter (opening diameter) of the opening 6a of the aperture diaphragm 6 is the same as the beam diameter of the light that travels along the light path in which the aperture diaphragm 6 is not disposed, in other words, the light having the narrower angular characteristics, and that is converted to a collimated beam by the collimator lens.

In this case, too, the numerical apertures of the two beams of light L1 and L2 can be made equal. In addition, it is possible to suppress the generation of stray light.

Figure 10:
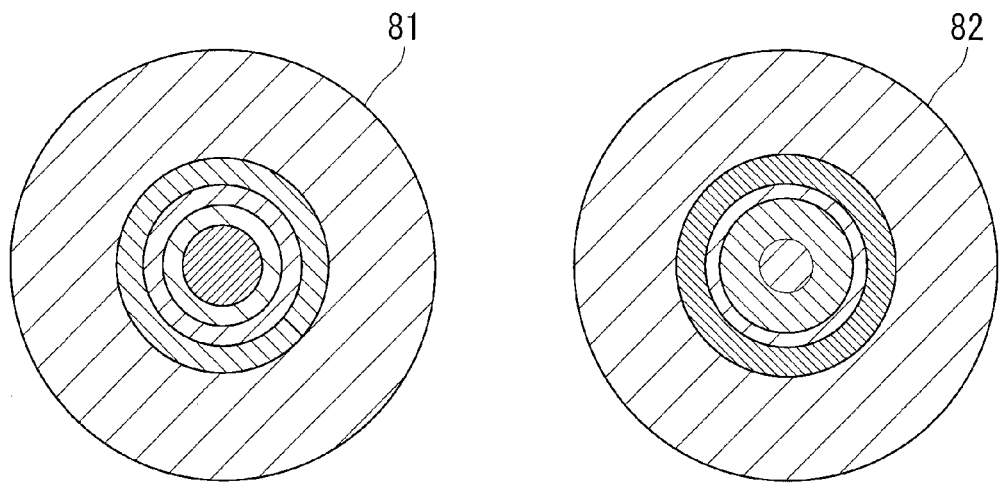
FIG. 10 is a diagram showing examples of filters provided in the light source apparatus in FIG. 9.

In addition, in the light source apparatus 300 according to the modification shown in FIG. 9, filters (light-distribution-characteristics adjusting portions) 81 and 82 that have light transmittance distributions like those shown in FIG. 10 may be provided in the openings 61a and 62a. In FIG. 10, the different hatching patterns indicate differences in light transmittance.

By providing such filters 81 and 82, it is possible to correct the shape (profile) of the angular characteristics of each of the beams of light L1 and L2. In other words, in the case where 100% of the light L1 and L2 passes through the opening 6a, although the numerical apertures of the two beams of light L1 and L2 incident on the entrance end 7a of the light guide 7 can be made equal, the profiles of the angular characteristics cannot be made equal. Thus, by independently correcting the light intensities at each position of the light L1 and L2 with the filters 81 and 82, the profiles of the two angular characteristics can also be made equal, and it is possible to produce output light in which the color is even more uniform over the entire beam.

Figure 11:
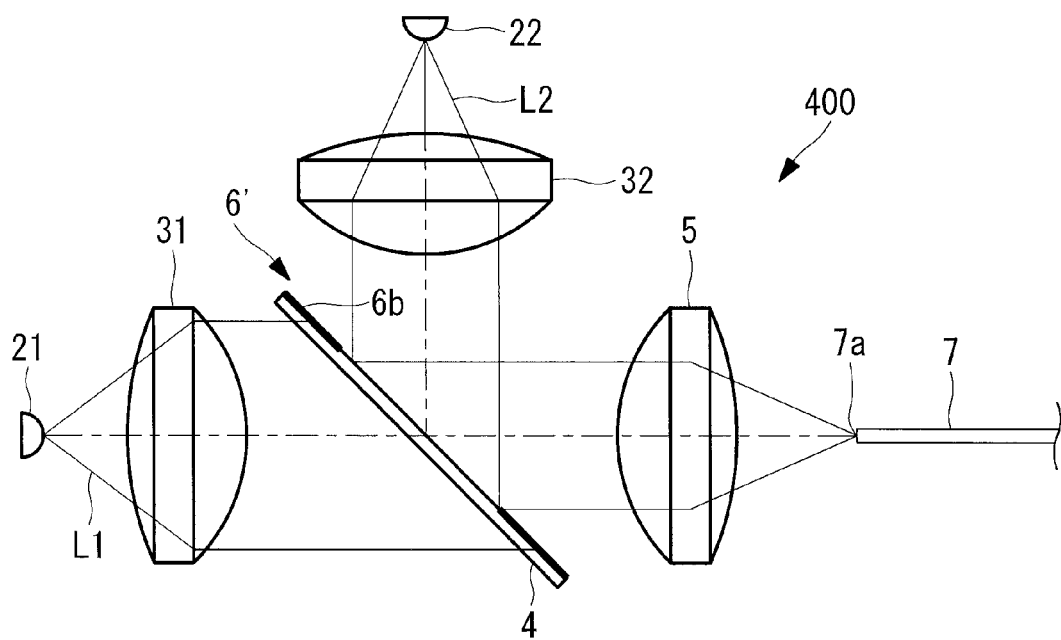
FIG. 11 is a diagram showing the overall configuration of another modification of the light source apparatus in FIG. 1.

In this embodiment, although it has been assumed that the aperture diaphragm 6 is formed separately from the other optical elements 31, 32, 4 and 5, instead of this, it may be formed as a single unit together with one of the other optical elements 31, 32, 4 and 5. FIG. 11 shows an example in which an aperture diaphragm 6' is formed as a single unit together with the dichroic mirror 4, in the light path configuration shown in FIG. 1. Specifically, the aperture diaphragm 6' is formed of a light-blocking film 6b that is provided on one of the surfaces of the dichroic mirror 4 and that blocks the first light L1. By doing so, it is possible to further simplify the light path configuration of the light source apparatus 400.

In this embodiment, although it has been assumed that the dichroic mirror 4 is used as the combining portion, the configuration of the combining portion is not restricted thereto, and another optical element that combines a plurality of beams of light with different wavelength bands into a single light path may be used. For example, a diffractive optical element that utilizes the spectral dependency of diffraction may be used, or a half-mirror may be used. In addition, instead of the LEDs 21 and 22 in this embodiment, an LD (laser diode) may be used.

In this embodiment, although it has been assumed that the collimator lenses 31 and 32 are used as the light collimating portions, the configuration of the light collimating portions is not restricted thereto, and a collimator mirror may be used. In addition, although it has been assumed that the condenser lens 5 is used as the focusing portion in this embodiment, the configuration of the focusing portion is not restricted thereto, and a focusing mirror may be used. Furthermore, instead of a multimode fiber, an optical rod may be used as a concrete example of the light guide 7.

REFERENCE SIGNS LIST 1, 100, 200, 300, 400 light source apparatus
21, 22, 23 LED (semiconductor light source)
31, 32, 33 collimator lens (light collimating portion)
4, 41, 42 dichroic mirror (combining portion)
5 condenser lens (focusing portion)
6, 6' aperture diaphragm (light-distribution-characteristics adjusting portion)
6a opening
7 light guide
7a entrance end
81, 82 filter (light-distribution characteristics adjusting portion)

The invention claimed is:

1. A light source apparatus comprising:
a plurality of semiconductor light sources that output beams of light having mutually different wavelengths;
a plurality of light collimating portions that convert the respective beams of light output from the plurality of semiconductor light sources to collimated beams;
a combining portion that combines the plurality of collimated beams produced by the plurality of light collimating portions into a single light path;
a light guide whose entrance end is disposed in the single light path and that guides the light incident on the entrance end to an exit end;
a focusing portion that focuses the collimated beams combined by the combining portion onto the entrance end of the light guide; and
a light-distribution-characteristics adjusting portion that adjusts beam diameters of the plurality of beams of light so that numerical apertures of the plurality of beams of light incident on the entrance end of the light guide are made substantially equal, wherein
the light-distribution-characteristics adjusting portion is disposed between the plurality of light collimating portions and the combining portion.

2. The light source apparatus according to claim 1, wherein the light-distribution-characteristics adjusting portion includes an aperture diaphragm.

3. The light source apparatus according to claim 2, wherein the aperture diaphragm is disposed in each of a plurality of light paths between the plurality of light collimating portions and the combining portion, and opening diameters of the individual aperture diaphragms are substantially the same.

4. The light source apparatus according to claim 3, wherein
the light-distribution-characteristics adjusting portion includes a filter that is provided in an opening of the aperture diaphragm and that adjusts the light intensity of the beam of light passing through the opening; and
the filter has a light transmittance distribution so that spatial intensity distributions of a plurality of beams of light that are converted to substantially a same beam diameter are made equal.

5. The light source apparatus according to claim 2, wherein
the light-distribution-characteristics adjusting portion includes a filter that is provided in an opening of the aperture diaphragm and that adjusts the light intensity of the beam of light passing through the opening; and
the filter has a light transmittance distribution so that spatial intensity distributions of a plurality of beams of light that are converted to substantially a same beam diameter are made equal.

6. The light source apparatus according to claim 1, wherein the light-distribution-characteristics adjusting portion is disposed in each of a plurality of light paths between the plurality of light collimating portions and the combining portion, and opening diameters of the individual light-distribution-characteristics adjusting portions are substantially the same.

7. The light source apparatus according to claim 6, wherein
the light-distribution-characteristics adjusting portion includes a filter that adjusts the light intensity of the beam of light passing through the light-distribution-characteristics adjusting portion; and
the filter has a light transmittance distribution so that spatial intensity distributions of a plurality of beams of light are converted to substantially a same beam diameter are made equal.

8. The light source apparatus according to claim 1, wherein
the light-distribution-characteristics adjusting portion includes a filter that adjusts the light intensity of the beam of light passing through the light-distribution-characteristics adjusting portion; and
the filter has a light transmittance distribution so that spatial intensity distributions of a plurality of beams of light are converted to substantially a same beam diameter are made equal.

9. A light source apparatus comprising:
a plurality of semiconductor light sources that output beams of light having mutually different wavelengths;
a plurality of light collimators that convert the respective beams of light output from the plurality of semiconductor light sources to collimated beams;
an optical element selected from the group consisting of a dichroic mirror and a half-mirror that combines the plurality of collimated beams produced by the plurality of light collimators into a single light path;

a light guide whose entrance end is disposed in the single light path and that guides the light incident on the entrance end to an exit end;

one of a lens and a mirror that focuses the collimated beams combined by the optical element onto the entrance end of the light guide; and an aperture diaphragm that adjusts beam diameters of the plurality of beams of light so that numerical apertures of the plurality of beams of light incident on the entrance end of the light guide are made substantially equal, wherein the aperture diaphragm is disposed between the plurality of light collimators and the optical element.

\* \* \* \* \*